Figure 1:
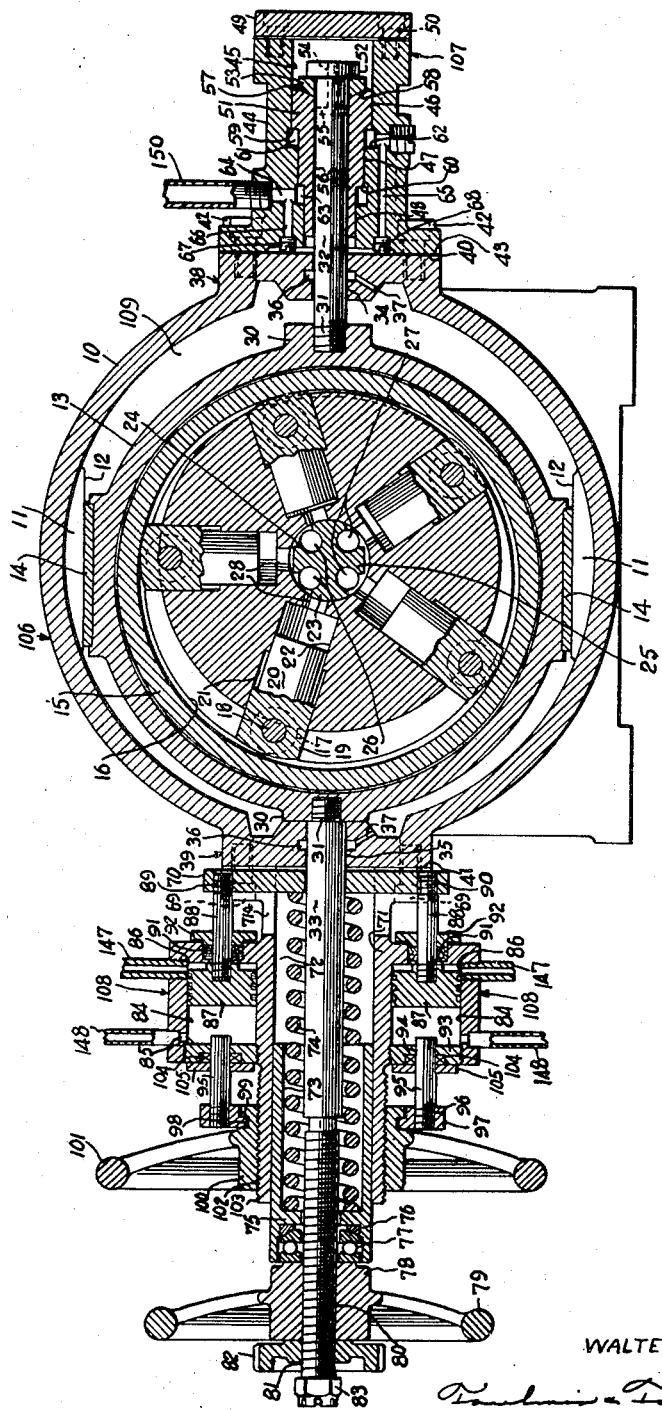

Feb. 18, 1941.    W. ERNST    2,232,104
METHOD FOR MOLDING WORKPIECES
Original Filed Aug. 16, 1938    2 Sheets-Sheet 1

Inventor
WALTER ERNST
Attorneys

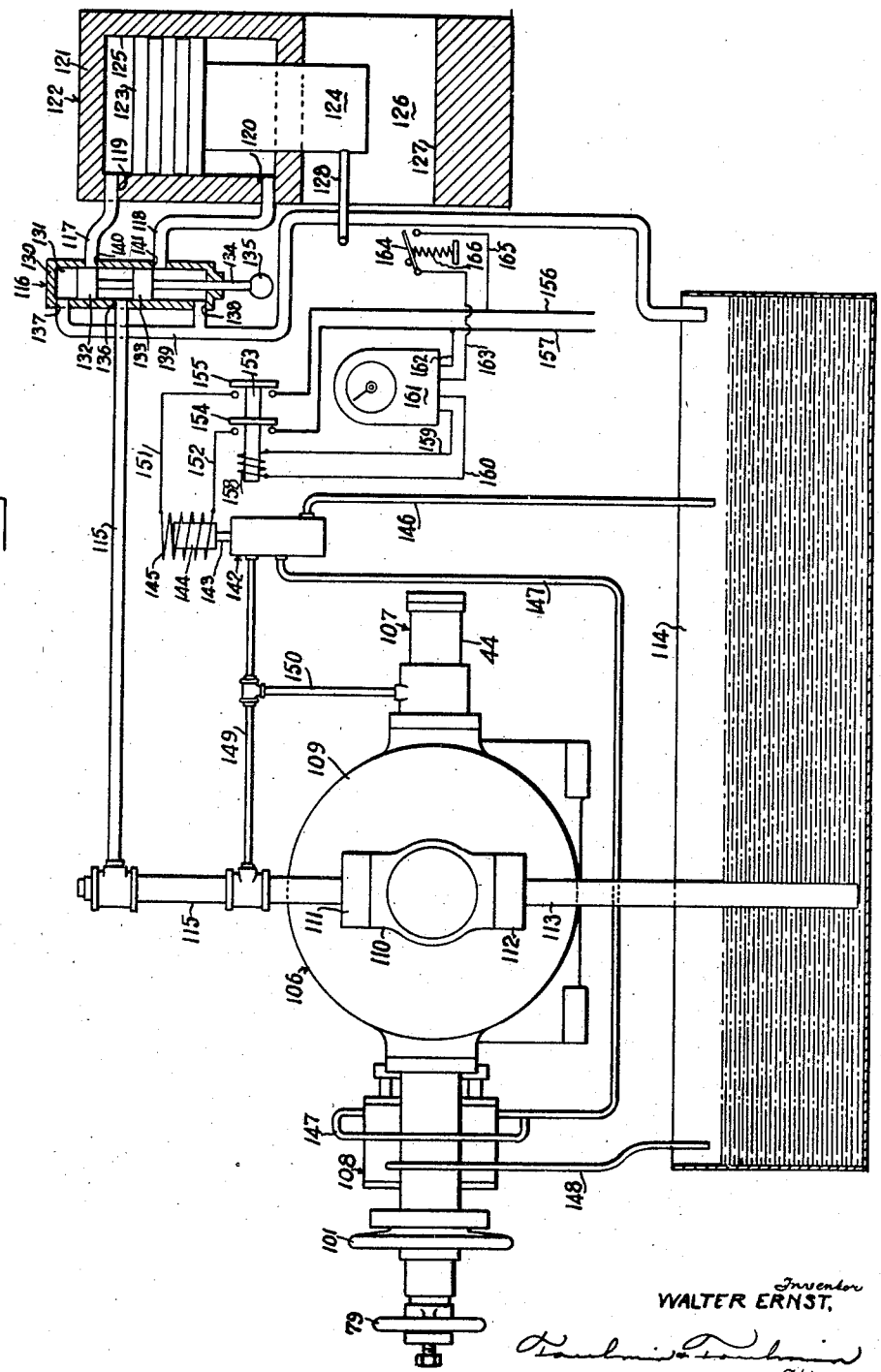

Patented Feb. 18, 1941

2,232,104

UNITED STATES PATENT OFFICE 2,232,104

METHOD FOR MOLDING WORKPIECES

Walter Ernst, Mount Gilead, Ohio, assignor to The Hydraulic Development Corp'n, Inc., Wilmington, Del., a corporation of Delaware Original application August 16, 1938, Serial No. 225,156. Divided and this application April 6, 1939, Serial No. 266,393

2 Claims. (Cl. 18—55)

This invention relates to hydraulic control systems and methods of pressing workpieces and a method of pressing such workpieces with multiple pressures.

Another object is to provide a method of molding workpieces consisting in applying a moderate pressure to the material while the material softens and partially conforms to the shape of the mold and thereafter to apply a higher pressure to the material to force the softened material into the remaining portions of the mold, this being especially valuable in the case of complicated or intricate shapes of molds.

Another object is to provide a method of molding workpieces consisting, as described immediately above, wherein the initial pressure is applied for a predetermined period of time, at the expiration of which the higher pressure is then applied automatically.

This application is a division of my application, Serial No. 225,156, filed August 16, 1938.

In the drawings:

Figure 1 is a transverse section through a radial pump embodying the adjustable high and low pressure control of this invention; and Figure 2 is a diagrammatic view, partly in section, of a hydraulic press control circuit utilizing the adjustable high and low pressure controlled radial pump of this invention.

In general, the adjustable high and low pressure control for radial pumps of this invention consists of a means for adjustably shifting the pressure control, such as the shift ring of the pump, to a plurality of different stages so that the pump may deliver pressure fluid up to a certain predetermined pressure and then shift to its neutral or "no delivery" position, after which time it may again be placed upon delivery up to the attainment of a new and different pressure level, whereupon it again shifts to its neutral or "no delivery" position.

Referring to the drawings in detail, Figure 1 shows a pump having a casing 10 with pads 11 having flat surfaces 12 for reciprocably supporting the shift ring or flow-control member 13 of the pump, bearing plates 14 being inserted therebetween. Rotatable within the shift ring 13 of the pump is a secondary rotor 15, provided with lateral grooves 16 engaged by rollers 17 mounted upon shafts 18, passing through the heads 19 of pistons 20. The latter are reciprocable in radial bores 21 in a primary rotor or cylinder barrel 22 around a fixed pintle 23. The latter is provided with cutaway portions 24 and 25 communicating, respectively, with longitudinal pairs of ports 26, 27, through which fluid is conveyed to and from the cylinder bores 22 by means of the ports 28. The details of construction of the pump mechanism within the shift ring 13 form no part of the present invention, and may consist of one or a variety of forms. A typical form of such a pump is disclosed in the copending application of Walter Ernst, Ser. No. 87,028, filed June 24, 1936, which application matured into United States Patent No. 2,159,553, dated May 23, 1939.

The shift ring 13 is provided with diametrically disposed bosses 30, having threaded sockets 31 for the reception of the shift rods 32 and 33, respectively, passing through bores 34 and 35 in the pump casing 10. The bores 34 and 35 are provided with leakage chambers 36 having leakage passageways 37 leading back to the interior of the casing 10. The pump casing 10 is provided with side portions 38 and 39, containing the bores 34 and 35 and having flattened end surfaces 40 and 41, respectively. Clamped against the end surface 40, as by the screws 42, is the corresponding surface 43 of the servomotor casing 44. The latter contains a cylinder bore, generally designated 45, and having three portions 46, 47 and 48. The cylinder bore 45 is closed by a cylinder head 49 secured by the screws 50 to the servomotor casing 44.

Reciprocable within the cylinder bore 45 is a stepped piston head, generally designated 51. The latter is mounted upon the shift rod 32 and limited in its position thereon by the head 52 and the collar 53. Leakage escaping past the piston head 51 drains back into the interior of the casing 10 by way of the passageways 54 and 55 in the shift rod 32, and thence by way of the longitudinal passageway 56, through the piston head 51, into the chamber 36 and pasageway 37. The collar 53 is provided with a conical end 57 cooperating with a similar conical surface 58 in the piston head 51. The latter is provided with portions of different diameters, with annular shoulders or piston areas 59 and 60 therebetween. The piston area 59 opens into a chamber 61 with a port 62 leading thereto, whereas the piston area 60 opens into a chamber 63 having a similar port 64 leading thereto. Longitudinal passageways 65 and 66 lead from the ports 62 and 64 to the end ports 67 and 68, respectively. The ports 67 and 68 are threaded so that they may be closed by means of threaded plugs. The provision of the piston areas 59 and 60 enables the exertion of different thrusts against the piston head 51 because of the difference in the areas of these annular piston surfaces.

Secured to the flat surface 41 of the side portion 39, as by the screws 69, is the control casing 71. The control casing 71 is provided with a slot 71a within which a yoke 70 is arranged to slide. The control casing 71 is also provided with a cylindrical bore 72, having therein a sliding sleeve 73 for receiving a coil spring 74. One end of the latter bears against the yoke 70 and the other end against the internal flange 75, having on its opposite side the collar 76 and ball thrust bearing 77 engaged by the hub 78 of a hand wheel 79. The latter is provided with a threaded bore 80 engaging the threaded end 81 of the shift rod 33 and locked in any desired position by the locknut 82. A retaining nut 83 is mounted on the extreme end of the threaded end 81. By rotating the hand wheel 79 the coil spring 74 may be caused to engage the flange 75 of the sleeve 73 with varying pressure, which is transmitted, through the shift rod 33, to the pump shift ring 13, and opposed by one of the piston areas upon the servomotor piston head 51.

The control casing 71 is likewise provided with a pair of cylinder bores 84 having communicating ports 85 and 86 at opposite ends thereof. Reciprocable in the cylinder bores 84 are piston heads 87 with piston rods 88 threaded therein, as at 89. The opposite ends of the piston rods 88 are threaded into the sockets 90 of the yoke 70. Surrounding the piston rods 88 are the packings 91, compressed by the glands 92 for the purpose of preventing leakage. The cylinder bores 84 are closed at their opposite ends by the cylinder heads 93, having apertures 94 through which pass the stop rods 95, the opposite ends of which are threaded as at 96 into the ring 97. The latter is provided with a ridge 98 engaging a corresponding groove 99 in the hub 100 of a hand wheel 101. The hub 100 is threaded internally, as at 102, and engages the threaded portions 103 upon the outer surface of the control casing 71. When the hand wheel 101 is rotated, the stop rods 95 are advanced into or withdrawn from the chambers within the cylinder bores 84, thereby providing adjustable abutments against which the piston heads 87 will come to rest when the pressure fluid is supplied thereto through the ports 86. Oil seals 104 prevent leakage around the stop rods 95 and are held in position by the retainers 105.

The radical pump and its associated control mechanism shown in Figure 1 may be utilized in a variety of circuits. One such circuit is shown in Figure 2, and consists of the pump, generally designated 106, with its servomotor, generally designated 107, and control device, generally designated 108. The casing 10 of the pump 106 is provided with end plates 109, to one of which is secured the fluid outlet connection 110 having a pressure connection 111 and a suction connection 112. A suction pipe 113 runs downwardly from the suction connection 112, into the interior of a fluid tank 114. Running from the pressure connection 111 is a pipe 115 leading to a four-way valve, generally designated 116, from which the lines 117 and 118 lead respectively to the ports 119 and 120 at the opposite ends of the main cylinder 121 of a hydraulic press, generally designated 122. This press is represented diametrically, and contains a piston 123 with a piston rod 124, these being reciprocable within the cylinder bore 125 within the main cylinder 121. The hydraulic press 122 is provided with a frame 126 connecting the main cylinder 121 with the press bed 127, upon which the workpiece or die is supported. The piston rod 124 is provided with an arm 128, arranged to operate a limit switch, in a manner subsequently to be described.

The four-way valve 116 is of a conventional type, and consists of a casing 130 having a bore 131, within which reciprocate the valve heads 132 and 133 on the valve rod 134. At the end of the latter is a handle 135, shown diagrammatically as a ball, but alternatively consisting of a lever or any other suitable means of shifting the valve rod 134. The casing 130 is provided with a central port 136 for the connection of the pump pressure line 115, and end ports 137 and 138 from which the exhaust line 139 runs to the tank 114. Also provided are two intermediate ports 140 and 141, from which the lines 117 and 118 lead respectively to the main cylinder ports 119 and 120, as previously stated. By shifting the valve rod 134 and its heads 132 and 133, the flow from the pump, through the pump pressure line 115, may be directed either to the upper or lower part of the main cylinder 121, while the opposite side thereof is connected to the exhaust line 139, in the manner well known to those skilled in the art. Thus, the shifting of the four-way valve 116 controls the distribution of pressure fluid from the pump to the press 122 in order to advance or retract the piston 123 and its piston rod 124.

The portion of the hydraulic circuit by which the pump and servomotor control systems are operated includes a three-way valve 142, of a conventional type, and having a valve rod 143, terminating in the armature 144 adapted to be shifted by the energization of the solenoid 145. The latter is connected to an electrical circuit, in a manner subsequently to be described. From the three-way valve 142, the exhaust conduit 146 leads downwardly to the fluid tank 114, whereas the pressure conduit 147 leads to the ports 86 at the righthand ends of the cylinder bores 84 (Figure 1), from the opposite ends of which the exhaust line 148 leads downwardly to the fluid tank 114. The three-way valve 142 is supplied by pressure fluid through the conduit 149 leading to it from the pump pressure fluid line 115, a branch conduit 150 proceeding to one or both of the ports 62 or 64 in the servomotor casing 44 (Figure 2).

The servomotor 107 may be caused to become operative and shift the shift ring 13 of the pump 106 to its neutral or "no delivery" position at any one of three predetermined pressures for the same setting of the thrust of the coil spring 74 (Figure 1). These three different pressures are determined by the area on the servomotor piston head 51, which is subjected to a pressure fluid reaching it from the conduit 150. If both of the annular piston areas 59 and 60 in the chambers 61 and 63 are subjected to this pressure fluid, then the maximum area of the servomotor piston 51 is in use, and a relatively low pressure in the conduit 150 will cause the servomotor piston 51 to shift and overcome the thrust of the coil spring 74 in order to place the pump shift ring 13 in its neutral or "no delivery" position. If the annular piston area 59 alone is subjected to this pressure fluid, then an intermediate pressure will be required to overcome the thrust of the coil spring 74 and place the pump in its "no delivery" position. If, however, the smaller annular piston area 60 is alone subjected to this pressure fluid, then a relatively high pressure in the conduit 150 will be required to overcome the thrust of the coil spring 74 and shift the pump shift ring 13 to its neutral or "no delivery" position.

To utilize both piston areas 59 and 60 the ports 67 and 68 are unplugged while the port 62 remains plugged, thereby establishing a connection between the chambers 63 and 61 by way of the longitudinal bores 66 and 65. If the larger annular piston area 59 is to be utilized, the conduit 150 is connected to the port 62, and the ports 67, 68 and 64 are plugged. If, however, the smaller piston area 60 is to be utilized, the ports 67, 68 and 62 are plugged, in the manner shown in Figure 2.

The electrical circuit for energizing the solenoid 145 includes the lines 151 and 152, leading to the contractor 153 having normally open switch blades 154 and 155, adapted when closed to connect the lines 151 and 152, respectively, with the power lines 156 and 157. The operating coil 158 of the contactor 153 is connected, by the lines 159 and 160, to the timing device 161 from which the lines 162 and 163 lead, respectively, to the power line 157 and to the normally open limit switch 164. The limit switch 164 is adapted to be closed by the press arm 128 when it reaches a predetermined position, thereby connecting the line 163, through the limit switch 164, to the line 165 leading to the power line 156. The spring 166 normally opens the limit switch 164 when the press arm 128 is retracted.

Operation

In the operation of the circuit shown in Figure 2, let it be assumed that a relatively high pressure is desired to shift the pump shift ring 13 to its neutral position so that the connections of the servomotor 107 are as shown in Figure 1. The smaller annular piston area 60 is therefore utilized for this purpose, and subjected to the pressure fluid in the conduit 150. The hand wheel 79 is then turned until the coil spring 74 is given the desired thrust so that, for example, a pressure of 500 pounds per square inch is required at the annular piston area 60 to compress the coil spring 74 and move the pump shift ring 13 to its neutral or "no delivery" position. Let it be assumed that the pump 106 is in operation, supplying pressure fluid through the line 115 and valve 116 to the space above the press piston head 123. The piston head 123 and its piston rod 124 move downwardly, closing the press and engaging the workpiece so that pressure is built up to the specified pressure of 500 pounds per square inch.

When this pressure is reached, the servomotor piston 51 will move to the right (Figure 1), overcoming the thrust of the spring 74 and moving the shift ring 13 of the pump to its neutral or "no delivery" position. The pump 106 will therefore temporarily hold the pressure in the pressing cylinder 121 at 500 pounds per square inch. Meanwhile, at the time the press closed, its arm 128 closed the limit switch 164, thereby starting the timing device 161. After the expiration of the time period for which the timing device 160 is set, the latter closes the circuit, energizing the operating coil 158 of the contactor 153, shifting its switch blades 154 and 155 into a position to energize the solenoid 145. The latter then shifts the valve rod 143 of the three-way valve 142 so as to admit pressure from the conduit 149 to the conduit 147, and thence into the cylinder bores 84 against the pistons 87.

The pistons 87 then move to the left (Figure 1), carrying with them the yoke 70 and further compressing the coil spring 74. This action causes the shift rod 33 to move to the left, under the increased thrust of the coil spring 74, carrying with it the pump shift ring 13, shift rod 32 and servomotor piston head 51. The pistons 87 come to rest against the ends of the stop rods 95, the positions of which may be adjusted by turning the hand wheel 101, thereby regulating the additional compression space upon the coil spring 74, and hence, adjusting the high pressure stage of the pump. The pressure of 500 pounds per square inch now standing in the conduit 150 is therefore no longer sufficient to overcome the increased thrust of the coil spring 74. Accordingly, the pump again delivers pressure fluid to cause the piston 123 and its piston rod 124 to exert an increased pressing effect, until the pressure rises to a sufficient amount where it will again act against the annular piston area 60 and again shift the servomotor piston head 51 to the right, overcoming the increased thrust of the coil spring 74 and again moving the pump shift ring 13 to its neutral or "no delivery" position. At this greater pressure, for example 2,500 pounds per square inch, the pump is again shifted to its neutral or "no delivery" position automatically and without the necessity for attention on the part of the operator.

When the four-way valve 116 is shifted to supply pressure fluid to the port 120 and retract the pressing piston 123, the limit switch 164 is opened and de-energizes the timing device 161, in turn de-energizing and opening the contactor 153 and consequently de-energizing the solenoid 145. The three-way valve 142, therefore, shifts into a position closing off the conduit 149 from communication with the conduit 147, and connecting the latter to the exhaust conduit 146. The pressure is thus released from the righthand ends of the cylinder bores 84 (Figure 1) so that the thrust of the coil spring 74 moves the yoke 70 and piston heads 87 to the right to the positions shown in Figure 1. The electrical and hydraulic circuits are thus placed in readiness for the resumption of another pressing stroke, and the parts come to rest in the positions shown in Figure 2.

In the circuit shown in Figure 2, the pressure fluid employed in the hydraulic circuit has also been utilized for shifting the pistons 87. It will be obvious, however, that pressure fluid from any source, such as air pressure, may be used to shift these piston heads. It is also obvious that the timing device 161 may be omitted, and is also obvious that the three-way valve 142 may be shifted manually when the operator wishes to apply the additional pressing pressure. Alternatively, the three-way valve 142 may be shifted by some portion of the machine when it reaches a predetermined position, such as directly by the press arm 128.

The servomotor arrangement containing a plurality of annular piston areas adapted selectively to be subjected to pressure fluid in the hydraulic circuit is disclosed and claimed in the copending application of Ernst et al, Serial No. 220,046, filed July 19, 1938 and which has matured into Patent No. 2,230,054, dated January 28, 1941. It will be observed, however, that the servomotor would be operative for the present purpose with the employment of a single piston area instead of the more convenient plural piston arrangement shown in Figure 1.

The present invention finds an important application in plastic injection molding machinery and methods. With the use of certain molding materials or compounds, it is found desirable to inject the softened material into the mold and maintain it under a moderate pressure for a certain time, while the material softens and partially conforms to the shape of the mold.

After the expiration of this time, it is then found useful to apply a much higher pressure to the material to force it into the more intricate corners or cavities of the mold. In the present invention, however, these two pressure stages may be severed and adjusted relatively to each other throughout a wide range of pressures so as to adapt the invention most efficiently to the particular working conditions and materials.

It will be understood that I desire to comprehend within my invention such modifications as come within the scope of the claims and the invention.

Having thus fully described my invention, what I claim as new and desire to secure by Letters Patent is:

1. A method of molding workpieces from plastic material comprising softening the material, injecting the material into a mold by exerting hydraulic pressure on an injecting plunger, holding the material in the mold at said pressure for a predetermined time period, and thereafter increasing said hydraulic pressure acting upon said plunger, thereby applying a higher pressure to said material to fill out the mold.

2. A method of molding workpieces from plastic material comprising softening the material to render it plastic, injecting the softened material into a mold cavity by exerting a predetermined hydraulic pressure on an injecting plunger, maintaining said predetermined pressure for a predetermined interval of time so as to maintain substantially the same pressure on the material in the mold cavity, at the expiration of this time interval increasing said hydraulic pressure acting upon said plunger and maintaining said increased pressure for a predetermined time, thereby applying a relatively high pressure to the material to complete the molding operation, and thereafter releasing the pressure from the material.

WALTER ERNST.